US007784086B2

(12) United States Patent
Perkins et al.

(10) Patent No.: US 7,784,086 B2
(45) Date of Patent: Aug. 24, 2010

(54) METHOD FOR SECURE PACKET IDENTIFICATION

(75) Inventors: Gregory Michael Perkins, Pennington, NJ (US); Sathya Narayanan, Princeton, NJ (US)

(73) Assignee: Panasonic Corporation, Osaka (JP)

( * ) Notice: Subject to any disclaimer, the term of this patent is extended or adjusted under 35 U.S.C. 154(b) by 1204 days.

(21) Appl. No.: 11/370,767

(22) Filed: Mar. 8, 2006

(65) Prior Publication Data

US 2007/0214496 A1    Sep. 13, 2007

(51) Int. Cl.
| G06F 7/04 | (2006.01) |
| G06F 15/16 | (2006.01) |
| G06F 17/30 | (2006.01) |
| G06F 9/00 | (2006.01) |
| G06F 17/00 | (2006.01) |
| H04L 29/06 | (2006.01) |
| H04L 9/32 | (2006.01) |

(52) U.S. Cl. .............................. 726/3; 726/12; 726/15; 713/176

(58) Field of Classification Search ..................... 726/3, 726/12, 15; 713/176
See application file for complete search history.

(56) References Cited

U.S. PATENT DOCUMENTS

| 6,301,669 | B2 | 10/2001 | Boden et al. | |
| 6,496,935 | B1 | 12/2002 | Fink et al. | |
| 6,571,338 | B1 | 5/2003 | Shaio et al. | |
| 6,795,918 | B1 | 9/2004 | Trolan | |
| 7,061,899 | B2 * | 6/2006 | Walker et al. | 370/351 |
| 7,107,464 | B2 * | 9/2006 | Shapira et al. | 726/15 |
| 2003/0233568 | A1 * | 12/2003 | Maufer et al. | 713/200 |
| 2005/0266826 | A1 * | 12/2005 | Vlad | 455/410 |
| 2006/0126649 | A1 * | 6/2006 | Akiyoshi | 370/401 |
| 2006/0173794 | A1 * | 8/2006 | Sellars et al. | 705/76 |
| 2006/0176281 | A1 * | 8/2006 | Bennett et al. | 345/169 |
| 2008/0317036 | A1 * | 12/2008 | Chandrasiri et al. | 370/395.3 |
| 2009/0199009 | A1 * | 8/2009 | Chia et al. | 713/176 |

FOREIGN PATENT DOCUMENTS

WO     WO 0179959 A2 *   10/2001

OTHER PUBLICATIONS

S. Deering, R. Hinden, Internet Protocol, Version 6 (IPV6) RFC 2460, 1998, pp. 1-11.
S. Kent, S. Atkinson, Security Architecture for the Internet Protocol, RFC 2401, Nov. 1998, pp. 1-10.
M. Luby, J. Gemmell, L. Vicisano, L. Rizzo, M. Handley, and J. Crowcroft, Layered Coding Transport (LCT) Building Block, RFC 3451, Dec. 2002, pp. 1-20.

(Continued)

*Primary Examiner*—Shin-Hon Chen
(74) *Attorney, Agent, or Firm*—Harness, Dickey & Pierce, P.L.C.

(57) ABSTRACT

Methods and apparatus to limit access to a secure personal network are provided. The method includes receiving an Internet protocol (IP) packet of a device including a confirmation value associated with the SPN. The method compares the confirmation value to a predetermined confirmation value and allows access to the SPN when the confirmation value matches the predetermined confirmation value. The IP packet is dropped otherwise. The confirmation value and the predetermined confirmation value are generated by an algorithm including a pseudorandom number generator, a hash function and a one-time password.

26 Claims, 6 Drawing Sheets

OTHER PUBLICATIONS

D. Katz, K. Kompella, and D. Yeung, Traffic Engineering (TE) Extensions to OSPF, RFC 3630, Version 2, Sep. 2003, pp. 1-14.

S. Bradner, V. Paxson, IANA Allocation Guidelines for Values in the Internet Protocol and Related Headers, RFC 2780, Mar. 2000, pp. 1-10.

N. Haller, The S/Key One-Time Password System, RFC 1760, Feb. 1995, pp. 1-12.

N. Haller, C. Metz, P. Nesser, M Straw, A one-time Password System, RFC-2289, Feb. 1998, pp. 1-15.

C. Mitchell (Ed.), Security for Mobility, Institution of Electrical Engineers, London, 2003, chapter 9.4.

* cited by examiner

METHOD FOR SECURE PACKET IDENTIFICATION

FIELD OF THE INVENTION

The present invention relates, in general, to a method for limiting access to a network, and, more particularly, methods, systems and apparatus for limiting access to a secure personal network (SPN) responsive to a confirmation value (CV) transmitted as part of an Internet protocol (IP) packet.

BACKGROUND OF THE INVENTION

Security is a concern for devices configured to form a personal area network (PAN), a wireless home network, or a wireless local area network (LAN). A PAN may include devices connected to a gateway, some or all of which may be wireless. Wireless PAN devices are typically not secure. These devices may be prone to packet sniffing and thus permit unauthorized access into the PAN's gateway and to PAN device services, such as a global information network (e.g. the Internet). The unauthorized access may cause a processing power burden in the PAN devices as well as charges for services used by the unauthorized user. Direct attacks on a PAN may also substantially reduce or disrupt service on the PAN. For example, when an SPN includes an Internet-enabled cellular phone, an unauthorized device may be able to use the cellular phone to access the Internet thus increasing service charges for the cellular phone owner.

A user may not be vigilant in providing security to a PAN. Security methods exist, such as layer 2 media access control (MAC) filtering and firewalls. PAN devices are typically low-power and thus unable to implement a robust security scheme. Layer 2 and layer 3 encryption are also available as security methods. Not all devices that are part of a PAN, however, may be capable of providing encryption, due to hardware limitations. Even devices that are capable of encryption may incur a processing cost which may place a substantial burden in processing power on the device. These security and encryption methods may be cumbersome to a user to correctly configure and update, particularly as the number of devices in the PAN increase.

SUMMARY OF THE INVENTION

The present invention is embodied in a method to permit access to resources on a network by a device which transmits Internet protocol (IP) packets. The method includes obtaining a confirmation value and transmitting the confirmation value as part of each of the IP packets of the device. The confirmation value is generated by an algorithm selected from the group consisting of a pseudorandom number generator, a hash function and a one-time password. Access to resources on the network is selectively permitted responsive to the confirmation value.

The present invention is also embodied in a method to limit access to a secure personal network (SPN) for a device having SPN identification parameters. The method includes receiving an Internet protocol (IP) packet of the device. The packet includes a confirmation value. The method further includes comparing the confirmation value to a predetermined confirmation value. The method determines to allow access to the SPN when the confirmation value matches the predetermined confirmation value. The method further determines to drop the IP packet when the confirmation value does not match the predetermined confirmation value. The confirmation value and the predetermined confirmation value are generated by an algorithm selected from the group consisting of a pseudorandom number generator, a hash function and a one-time password.

The present invention is further embodied in a system for limiting access to a secure personal network (SPN). The system includes a remote device configured to include a confirmation value in the IP packet associated with the device. The system further includes a gateway which accepts an IP packet when the IP packet includes the confirmation value and drops the IP packet when the IP packet does not include the confirmation value. The gateway compares the confirmation value to a predetermined confirmation value to determine whether the confirmation value matches the predetermined confirmation value. The confirmation value and the predetermined confirmation value are generated by an algorithm selected from the group consisting of a pseudorandom number generator, a hash function and a one-time password.

The present invention is further embodied in apparatus for accessing a secure personal network (SPN). The apparatus includes an input terminal to receive a request to access the SPN, a processor to compute a confirmation value, and an output terminal to provide the confirmation value as part of an Internet protocol (IP) packet and to provide SPN identification parameters associated with the device. The confirmation value is generated by an algorithm selected from the group consisting of a pseudorandom number generator, a hash function and a one-time password.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Figure 1:
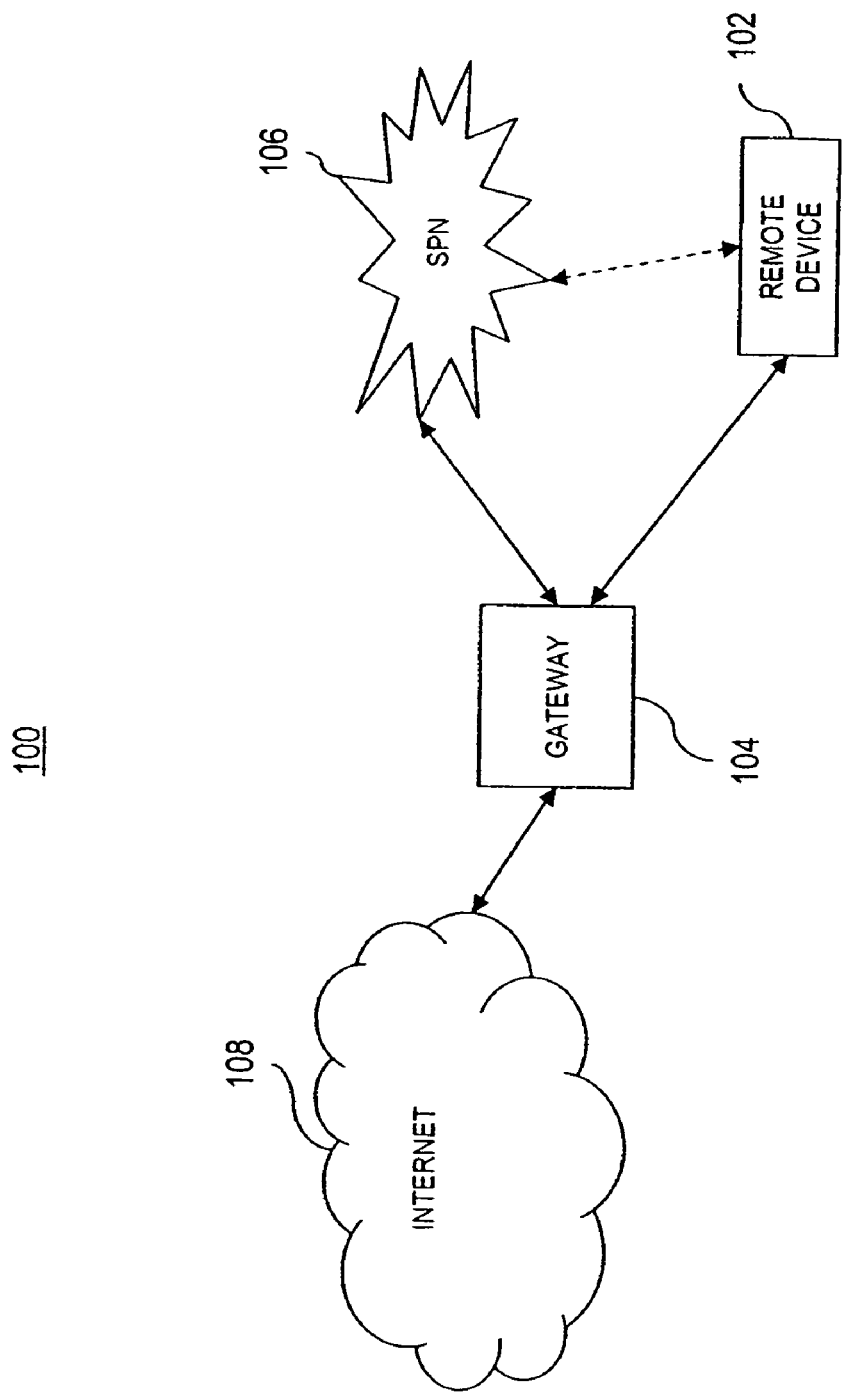
FIG. 1 is a system diagram of an exemplary system for limiting access to a SPN, according to the present invention.

The present invention is embodied in a method for limiting access to a secure personal network (SPN). Examples of PANs and their security needs are first presented in order to illustrate that various security levels for limiting access may be desirable depending upon the PAN environment. Second, an exemplary system that limits access to a SPN is described. Third, methods for associating a confirmation value (CV) with a SPN device and limiting access to an SPN by the gateway are described. Fourth, methods for inserting a CV in a portion of an IP packet are described. Fifth, various methods for generating a CV are described with respect to the security level requirements of the PAN environment. Sixth, recovery mechanisms for resynchronizing SPN devices and the gateway are described. Seventh, methods for providing windows of CVs are described, for example, as a mechanism to reduce the occurrence of resynchronization events. Eighth, an example of initializing and authenticating a device that is to be added to the SPN is described.

There may be various types of devices connected to a PAN as well as various types of PAN environments. Security needs for a PAN may depend upon the operating environment of the PAN devices as well as on the security capabilities of a PAN device (e.g. a device capable of encryption). It is desirable that a PAN include some security measure for limiting unauthorized access to resources that are available via the PAN. The security level used by the PAN may be determined by its operating environment (i.e. a PAN may have security policies that define its security operations in various environments).

A PAN may be used in a more secure environment where security needs are minimal. For example, a PAN used in a home environment with no outside access may not need any security measures. An example of such a PAN may include devices having a short-range connection, such as an ultra wide band (UWB), infrared (IR), radio frequency (RF), and/or a wired connection. For example, a minimal security environment may include a Bluetooth connection to an MP3 player, from within the home environment.

The cellular phone having Internet access even when it is used outside of the home may be relatively secure because it is mobile and thus less subject to persistent attacks. In this scenario, the PAN environment may still be relatively secure so that a relatively low level of security may be sufficient to prevent unauthorized access.

An increased level of security may be desired even though there is only a local connection, such as an IEEE 802.11 network. In this scenario, outside access to the PAN environment by an unauthorized device may be more likely to occur. For example, an unauthorized user may determine PAN access parameters by packet sniffing through a PAN device, such as a relatively stationary laptop computer (herein laptop), and thus access the PAN and further access the Internet through the PAN. An increased level of security may thus be desired for a local connection.

A PAN may need more security as the likelihood of outside access to the PAN by unauthorized users increases. An example of a less secure PAN environment may be a laptop operating on a remote connection from a wireless hotspot such as in an airport. An unauthorized user may determine PAN access parameters by packet sniffing. From the laptop however, an unauthorized user may gain access to confidential material as well as PAN resources. In this situation, a higher level of security may be desired to prevent unauthorized access.

According to an embodiment of the present invention, access to the SPN may be limited based upon a desired security level for the PAN environment. It is contemplated that the present invention, however, may not inhibit packet sniffing. It is understood that to inhibit packet sniffing, the channel may be encrypted, for example using IP Security (IPsec), wireless application protocol (WAP) or wired equivalent privacy (WEP).

According to an embodiment of the present invention, a secure personal network (SPN) is configured which limits access to the SPN. Remote devices connected to the SPN (herein SPN devices) generate confirmation values (CVs) which are transmitted as part of an Internet protocol (IP) packet to an SPN gateway. The gateway drops IP packets not including an approved CV. SPN devices are thus prevented from processing IP packets not approved by the gateway. This may provide an advantage for wireless devices, in particular, where it may be costly to forward packets.

Referring now to the drawing, in which like reference numbers refer to like elements throughout the various figures that comprise the drawing, FIG. 1 illustrates an exemplary system 100 that limits access to SPN 106 according to the present invention. Remote device 102 may access SPN 106 to attempt to gain access to Internet 108 through gateway 104. Gateway 104 desirably compares a CV transmitted in a portion of an IP packet of remote device 102 sent through SPN 106 to a predetermined CV, as described below. Alternatively, remote device 102 may attempt to access gateway 104 directly using access methods sniffed from SPN 106.

Gateway 104 thus limits access by SPN 106 and by remote device 102 according to the CV transmitted by remote user 102 and by other devices (not shown) on SPN 106. If remote device 102 is not an SPN device, gateway 104 desirably prevents remote device 102 from accessing SPN 106 and wasting the resources of SPN devices (not shown), such as packet transfer fees as well as battery power (and may help limit local denial-of-service (DoS) attacks as well). If remote device 102 is a member of SPN 106, IP packets of remote device 102 may be transmitted to Internet 108 via SPN 106. The present invention provides security by checking a CV while using only a small amount of computation cost and a small amount of storage space for each SPN device.

Although FIG. 1 illustrates network 108 as the Internet, it is understood that network 108 may be any global information network, local area network, or direct connection, such as a universal serial bus (USB) cable. Remote device 102 may communicate to gateway 104 through any wired (e.g., USB) or wireless (e.g., Bluetooth) connection.

Gateway 104 may operate in a manner similar to a firewall, except that it is desirably implemented in Open Systems Interconnection (OSI) layer 3 and uses pre-agreed security mechanisms with the SPN devices. It is contemplated that remote device 102 may communicate directly with SPN 106, as shown by the dashed line. For example, each SPN device may act as a gateway by checking the CV of remote device 102 with predetermined CVs stored at each SPN device.

Figure 2:
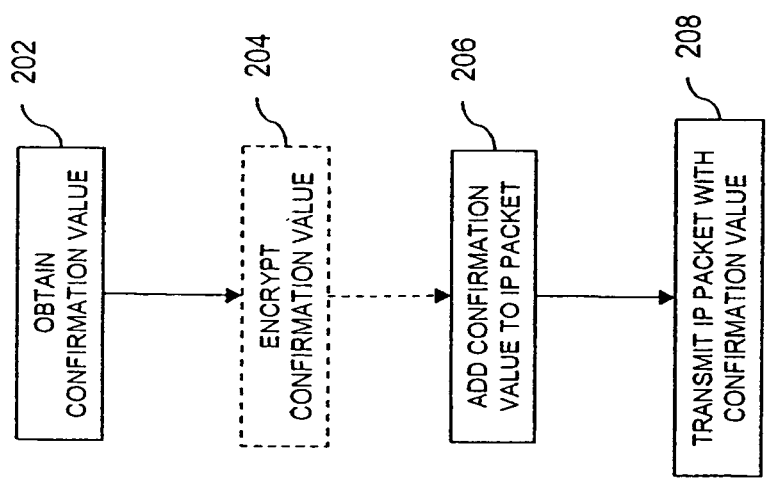
FIG. 2 is a flowchart illustrating an exemplary method of providing a CV to a SPN device, according to the present invention.
Figure 3:
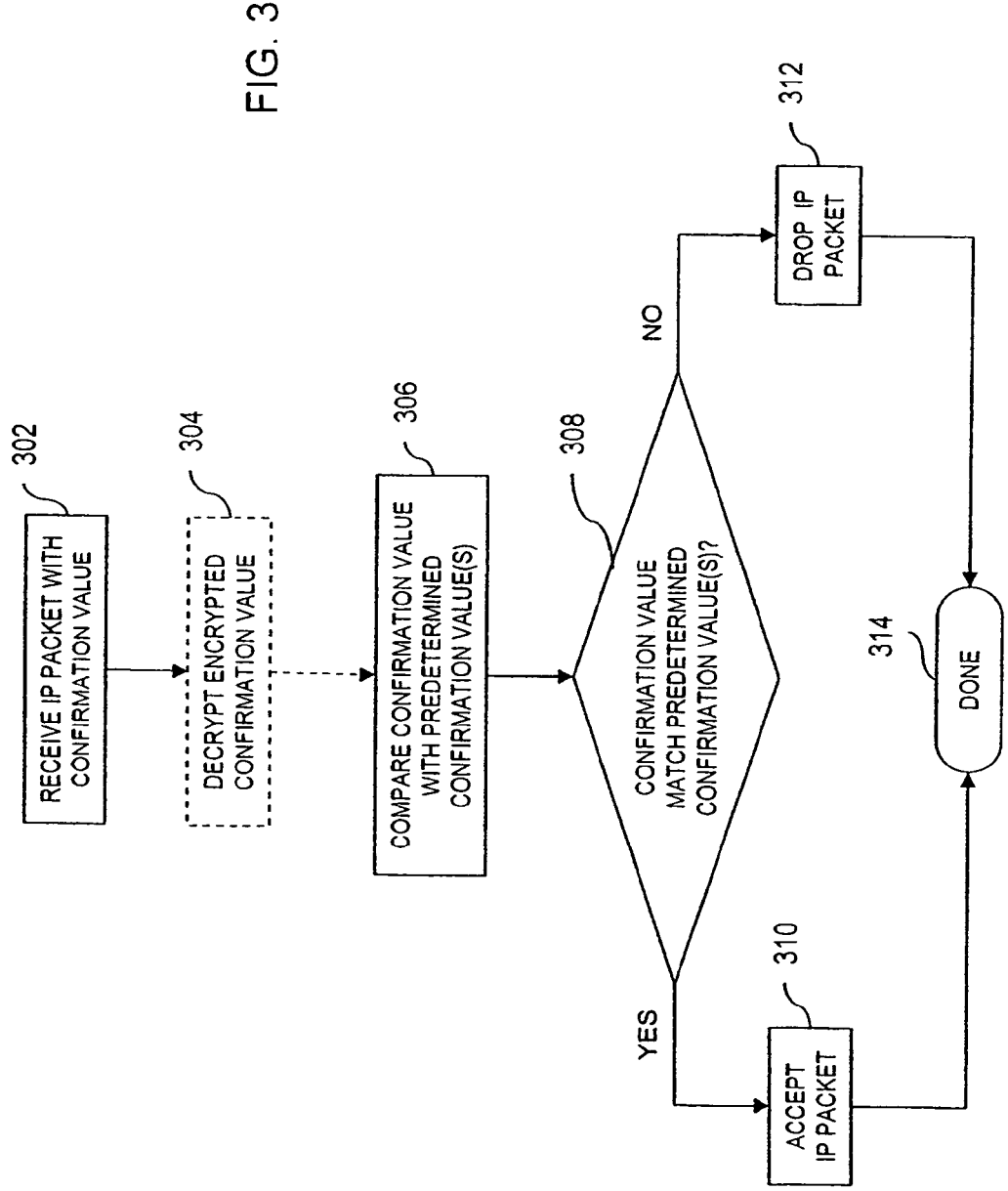
FIG. 3 is a flowchart illustrating an exemplary method of limiting access to a SPN by a gateway, according to the present invention.

Referring now to FIGS. 2 and 3, exemplary methods for associating a CV with an SPN device and limiting access to an SPN by a gateway are described below.

FIG. 2 is a flowchart illustrating an exemplary method for providing a CV to an IP packet of an SPN device according to an embodiment of the present invention. It is assumed that the SPN device is authorized to access the SPN and includes SPN identification parameters as described below. In step 202, a CV is obtained as described below. In optional step 204, the CV value may be encrypted. In step 206, the CV (or the encrypted CV of optional step 204) is inserted into the IP packet. In step 208, the IP packet with the CV value is transmitted.

In an exemplary embodiment, the CV is desirably about 6 bytes, e.g. 4-8 bytes. It is understood that the CV may be of any size. It is desirable to generate a CV having a small number of bytes. A small CV may be computed by a remote device without taxing the computing power of the device.

Optional step 204 encrypts the CV. Because the CV is desirably small and encryption is performed only on the CV, the computational processing load on the SPN device may be small. The CV may be encrypted, for example, using any symmetric key algorithm, such as data encryption standard (DES), triple-DES (3DES) and advanced encryption standard (AES).

FIG. 3 is a flowchart illustrating an exemplary method for limiting access to a SPN by a gateway according to an embodiment of the present invention. In step 302, the gateway receives an IP packet having a CV in a portion of the IP packet. In optional step 304, if the received CV is encrypted, the gateway may decrypt the CV. In step 306, the received CV is compared with at least one predetermined CV. In step 308, a decision is reached whether the received CV matches at least one predetermined CV.

If the received CV matches at least one predetermined CV, processing proceeds to step 310, and the IP packet is accepted. Processing is complete at step 314.

If the received CV does not match at least one predetermined CV, processing proceeds to step 312, and the IP packet is dropped. Processing is complete at step 314. It is contemplated that a received IP packet which does not include a value in an appropriate portion of the IP packet may be dropped prior to performing step 302.

It is contemplated that the method illustrated in FIG. 3 may be performed by the gateway or by each SPN device. Decryption of an encrypted CV, optional step 304, may be performed by the gateway or at each SPN device if the gateway or each SPN device is decryption-capable. If the SPN includes devices that are not decryption-capable, the CV is not encrypted or decrypted when sending packets to these devices.

The gateway may check the received CV for every IP packet. Alternatively, the gateway may check one packet out of every N packets received, where N is a small integer. Less computation may be required, and thus less power consumption by the gateway if one packet out of every N packets is checked. Security may still be provided by checking one out of every N packets. For example, an unauthorized user may not be able to maintain a transmission control protocol (TCP) connection if every third IP packet received is dropped. Checking one packet out of N packets, however, may provide less security than checking every packet.

In an exemplary embodiment, every one out of 3-5 packets may be checked. It is understood that this number is not meant to be limiting. It is contemplated that the number of packets may be any number such that access to the SPN is limited to SPN devices.

An SPN device is thus prevented from processing requests from unauthorized users based upon the CV transmitted as part of the IP packet, as authenticated by a gateway. The gateway desirably prevents unauthorized users from using the SPN and its resources by filtering out any IP packets not including an authorized CV. The gateway may provide a simple mechanism for checking whether the IP packets belong to the SPN device such that the process may be virtually invisible to a user.

Figure 4:
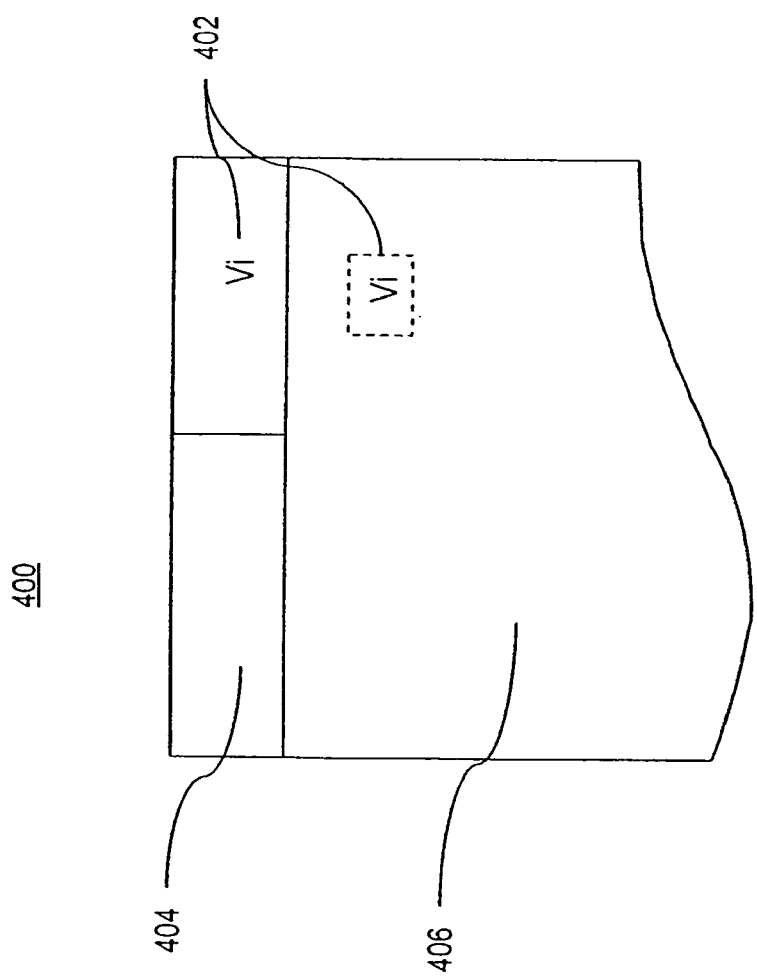
FIG. 4 is an example of transmitting a CV as part of an IP packet, according to the present invention.

Referring now to FIG. 4, exemplary methods for inserting a CV in a portion of an IP packet are described (step 206 in FIG. 2). FIG. 4 shows an illustrative example of transmitting a CV value in a portion of an IP packet 400 according to an exemplary embodiment of the present invention. CV 402, illustrated by $v_i$, may be placed in a header 404 or a portion of the payload 406.

If CV 402 is placed in payload 406, the gateway locates CV 402 in the payload and compares CV 402 to a predetermined CV as described above. Header 404 may include a flag that indicates the presence and/or location of CV 402 in payload 406. If CV 402 is verified as belonging to the SPN, it may be desirable to remove the CV 402 from payload 406 before the gateway passes IP packet 400.

If CV 402 is placed in the header 404, the gateway locates CV 402 from a portion of the header. Header 404 may include a flag that indicates the presence and/or location of CV 402 in header 404. If CV 402 is verified as belonging to the SPN, CV 402 may be removed from header 404 before the gateway passes IP packet 400. Alternatively, CV 402 may be passed as part of IP packet 400 after leaving the gateway.

Header 404 may be a fixed header or it may be an optional header. A fixed header, such as an IPv6 header or an IPsec header may be limited in allowing new fields or the type of new fields that may be added. The IPv6 header is described in RFC 2460 by S. Deering and R. Hinden entitled "Internet Protocol, Version 6," 1998. The IPsec header is described in RFC 2401 by S. Kent and S. Atkinson entitled "Security Architecture for the Internet Protocol," 1998.

A fixed header may include a bit which indicates the presence of an optional header. An example of an optional header is described in RFC 3451 by M. Luby, J. Gemmell, L. Vicisano, L. Rizzo, M. Handley, and J. Crowcroft entitled "Layered Coding Transport (LCT) Building Block," 2002. Optional headers may further be daisy-chained. For example, a bit may be provided in a first optional header corresponding to the presence of a second optional header, and so forth.

The optional header may be any optional header such as a Type/Length/Value (TLV) header described in RFC 3630 by D. Katz, K. Kompella, and D. Yeung entitled "Traffic Engineering (TE) Extensions to OSPF Version 2," 2003. Registration of the type of header and a new field for the CV, such as for a TLV header may be desired. Such a registration, however, may need to be approved by the IANA (Internet Assigned Numbers Authority, see RFC 2780 by S. Bradner and V. Paxson entitled "IANA Allocation Guidelines for Values In the Internet Protocol and Related Headers," 2000.) The optional header may be the same as known in the art optional headers except that a special field may be provided for the CV or encrypted CV.

Referring to step 202 and optional step 204 (FIG. 2), exemplary methods of generating a CV (and a predetermined CV) are now described. The function used to generate the CV may be simple or complex depending on the level of security desired. If the SPN environment is secure, for example, a short-range connection of a internet-enabled cellular phone and an MP3 player, a random number initialized by a parameter may be generated as the CV. The value may not change with each packet generated by the SPN device.

If greater security is desired, for example in an environment in which an unauthorized user may sniff the packets to determine and copy the fixed random value to access the SPN, increased security may be provided by using a pseudorandom number generator (PRN) initialized with a parameter as the CV and predetermined CV such that each IP packet is transmitted with a different random value.

If the SPN environment is relatively secure, for example, locally connected, the devices that are mobile, and/or devices are connected to the SPN for a short period of time, a PRN function may provide adequate security. If the SPN environment is less secure, the PRN function may provide inadequate security. For example the SPN devices may be locally connected but stationary. In this environment, the PRN function may be determined after sniffing a number of packets.

If the SPN environment is insecure, for example a remote connection in an airport, the CV and predetermined CV are desirably generated by a function that may be difficult to predict without knowing the function and/or a parameter used to initialize the function. For example, schemes such as hash functions using rotative and/or additive methodologies and one-time passwords (OTPs) may be used to generate CVs and predetermined CVs. One version of the OTP scheme is called S/KEY and is described in RFC 1760 by N. Haller entitled "The S/Key One-Time Password System," 1995. Other hash function examples include those described in RFC 2289 by N. Haller, C. Metz, P. Nesser, M. Straw entitled "A One-Time Password System," 1998, message digest (MD) algorithms such as MD5 and the secure hash algorithm (SHA) family such as SHA1.

As described above, it is contemplated that the complexity of the function used to generate the CV may be increased to offset a security level reduction if the gateway checks one out of every N packet rather than every packet.

Figure 5:
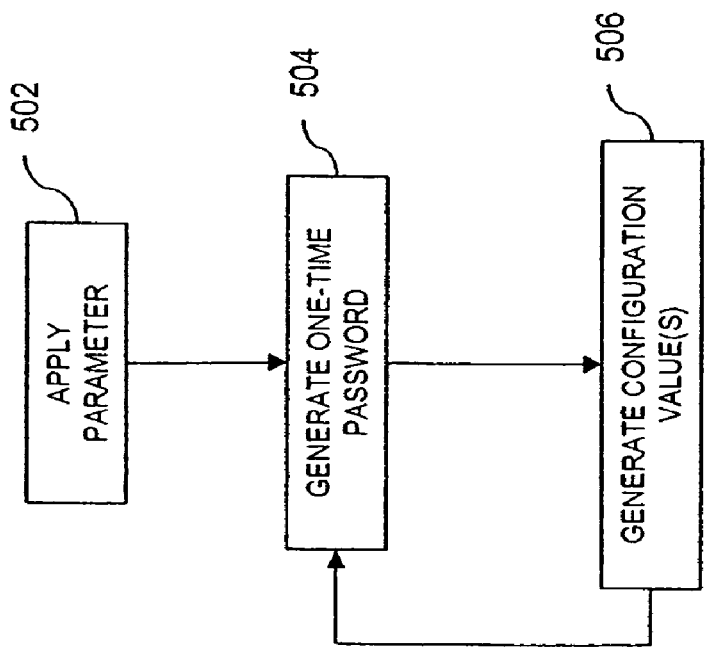
FIG. 5 is a flowchart illustrating an exemplary method of generating CVs, according to the present invention.

Referring now to FIG. 5, an exemplary method of generating CVs and predetermined CVs according to the present invention is described. In step 502, a parameter is applied to initialize an OTP consisting of a hash function. In step 504, the hash function generates the OTP as a function of the applied parameter. In step 506, the output of the hash function (i.e. hash(parameter)) is provided as a CV. The CV of step 506 may be recursively applied to the OTP of step 504 to subsequently compute hash (CV). With each use, the hash function creates a different CV (i.e., $[v_1, v_2, \ldots v_n]$, where $v_n$ represents a CV at an $n^{th}$ iteration of steps 504 and 506, where n is an integer).

In an exemplary embodiment, the size of the initialization parameter may be between 32 bits to 128 bits. It is understood that the size of the initialization parameter is not meant to be limiting. Any size may be used with any CV function. For example, a more complex function to compute the CV may use a smaller initialization parameter while providing the same security as a simpler function with a larger initialization parameter.

Encryption (step 204 of FIG. 2) may be desirable if the function used to generate a CV is simple, such as a random number or PRN generator and/or the SPN environment is not as secure as desired. If the function is complex, such as a secret keyed hash function, and/or uses a larger initialization parameter, encryption may not be necessary. In general, encryption may be used depending upon the type of CV function, initialization parameter size and SPN environment. Furthermore, not all remote devices may be capable, i.e. have appropriate hardware for encryption.

The SPN device is desirably provided with a parameter from the gateway to initialize the CV function. The CV may be obtained using any of the methods described above, such as a secure IPsec channel. As described above, the CV is desirably small in size and desirably uses only an amount of computational processing appropriate for the desired security by an SPN device. According to an exemplary embodiment, it is assumed that there are pre-existing security associations that allow for secure transfer and initialization of parameters. It is contemplated that if these security associations are not present, a direct wired or short-range wireless connection (such as UWB or IR) may be used to provide the secure transfer.

Ideally, an IP packet may be received from a SPN device having a CV which matches one predetermined CV. The gateway desirably transmits the IP packet from the SPN device. If the gateway drops too many IP packets from SPN devices, however, a recovery mechanism is desirable to resynchronize the SPN devices and gateway. For example, IP packets may become lost or received out of order. If the gateway expects to receive CV value $v_3$ but instead receives CV value $V_4$ because the IP packet containing $v_3$ was lost, the future predetermined CVs may not match the received CVs, causing timing synchronization problems. If too many of these IP packets are dropped, a recovery mechanism may need to be performed.

Furthermore, depending upon the function used to generate a CV and if encryption is used, an unauthorized user may determine the CV function by sniffing a sufficient number of packets. In this situation, a security mechanism is desirable to resynchronize the initialization parameter used to generate the CV at the SPN devices before that number of packets is transmitted.

According to an exemplary embodiment of the invention, resynchronization may be performed in response to a resynchronization event which may be generated as a recovery mechanism and/or a security mechanism.

Resynchronization is desirably performed automatically by the gateway, i.e., without being requested by the user or individual SPN devices.

A resynchronization event may also be periodically generated, as for a security mechanism. A resynchronization event may be generated in response to a number of dropped packets, as for a recovery mechanism. A resynchronization event may include a network resynchronization.

As a recovery mechanism, a synchronization event may be generated in response to an error count of dropped packets such that if N packets are dropped, a resynchronization event may be triggered for some to all SPN devices. For example, if significantly more than 10 consecutive packets are dropped due to timing synchronization problems between an SPN device and gateway, a resynchronization is may be desired to reinitialize or replace the function used to generate the CVs at the SPN device.

A periodically generated resynchronization event may include resynchronizing after a period of time is reached or after processing N packets. A time period or number of packets to be processed between resynchronization events may be determined, for example, by the type of function used to generate the CV and whether encryption on the CV is performed. For example, if the CV is encrypted with a symmetric key algorithm, about 100,000 packets may be processed between resynchronization events. If the CV is not encrypted but is a complex function, such as an OTP, about 5,000 packets may be processed. If the CV is not a complex function, for example if it is a PRN, it may be desirable to resynchronize after processing only 1,000 packets. It is understood that the above examples are illustrative of how a number of packets for periodic resynchronization may be determined based on the CV function and that the present invention is not limited to these values.

A resynchronization time period or number of received packets may also be determined based upon the operating environment of the SPN devices. For example, locally networked devices in a secure environment may not be subject to as much packet loss as a device operating in an area with considerable interfering traffic, e.g. an airport, and may thus use a less frequent resynchronization period. It may also be desirable to include a more frequent resynchronization period for devices in high traffic areas for security purposes. It is understood that the resynchronization period may further be determined based on a combination of the operating environment and CV function used, as well as any other desired variables.

A resynchronization process may be initialized by an IP packet sent to each device containing a special value, such as all 0's as the CV. Alternatively, a special IP packet may be sent to each device that is only used to initialize resynchronization. Each SPN device desirably interprets the special IP packet or IP packet with special value to determine that their resynchronization process has been initiated.

The IP packet for initialization of resynchronization may be encrypted. It is contemplated, however, that not all SPN devices may be capable of decryption. The SPN device and gateway may instead perform handshaking functions to verify that the SPN device is initialized and ready for a resynchronization process. It is contemplated that any method may be used to for verification of initialization within the scope of the present invention.

After initialization is complete, the resynchronization process may be performed. Resynchronization is desirably performed by updating the CVs for all SPN devices. Resynchronization desirably updates the initialization parameter used to generate the CV at the SPN devices, as described below.

In one exemplary embodiment, a new initialization parameter may be given to each SPN device. Depending on the location of the device relative to the gateway, i.e. local versus remote location, it may be desirable to encrypt the value of the parameter for security purposes. If the parameter is to be encrypted and not all SPN devices are capable of decryption, however, it may be desirable to use as strong an encryption function as possible.

In a further exemplary embodiment, a common starting parameter may be given to all devices during the resynchronization process. Alternatively, each SPN device may store the starting parameter provided by the gateway upon initialization to the SPN and use the same stored starting parameter for resynchronization.

In a further exemplary embodiment, a special resynchronization parameter may be used for the resynchronization process. This parameter may be stored in each SPN device and used when resynchronization is agreed upon.

In yet a further exemplary embodiment, the gateway may include multiple initialization parameters. A new initialization parameter may be passed to a device when the gateway determines that the received CV uses a prior initialization parameter value. It is contemplated that encryption may be used to transmit the new initialization parameter for devices that are decryption-capable.

During resynchronization, if the same initialization parameter is given to SPN devices and one of the SPN devices is not connected, that SPN device may not be updated. In a further exemplary embodiment, a predetermined number of CV's forming a window of CV's may be generated by the gateway and provided to each SPN device when it is first initialized for the SPN. The window of CV's desirably includes between about 5-10 CV's. It is understood that any window size may be used such that computational processing causes a limited power drain on the device. Each device may switch to another CV in the window after processing a predetermined number of packets, for example, after processing 5,000 packets. The gateway may thus check each received CV according to multiple CV's in the window.

As described above, in an ideal situation an IP packet may be received from a SPN device having a CV which matches one predetermined CV. The CV may be predetermined based on the initialization parameter and expected packet number. During transmission, however, IP packets may be lost or received out of order. The predetermined CV may be computed using an initialization parameter associated with a lost packet rather than the received packet and will thus drop the packet of the SPN device. If a single predetermined CV is used, a resynchronization event may be frequently triggered by a number of dropped packets, as described above.

According to an exemplary embodiment, it is desirable to provide a window of CV values that are pre-computed for a given initialization parameter, described further below. The window of CV values computes CVs for an expected current packet as well as previously expected packets and future expected packets for the given initialization parameter. The window of CVs are compared with the received CV from the SPN. If the received CV matches one of the predetermined CVs in the window, the packet is accepted and processed (otherwise it is dropped). If an SPN packet is lost or received out of order, the gateway may still be able to accept the packet and may thus reduce a number of resynchronization events triggered by dropped packets.

The number of CVs computed for the window may depend on an expected loss. For example, if all of the SPN devices are localized, such as through a Bluetooth connection, a smaller number of packets may be expected to be lost, such that the window of CVs may be small, for example may include three CVs. If devices are wirelessly connected to the SPN at a wireless hotspot such as an airport, more packet loss may be expected and the window of CVs may be larger. It is desirable to include prior CVs the present CVs as well as future CVs, such that the window of CVs include:

$$\text{Predetermined CV}(\text{parameter}_j) = [v_{i-n} \ldots v_{i-1} \, v_i \, v_{i+1} \ldots v_{i+n}] \quad (1)$$

where $v_i$ is the present CV, n is the number of values prior to and after the present CV, for a given parameter$_j$, and i, j, and n are integers. Any received CV which matches is one the predetermined CVs given by equation (1) may be accepted, steps 308 and 310 (FIG. 3).

In an exemplary embodiment the window may include 5 values (i.e., n=2) in equation 1. It is understood that this window size is not meant to be limiting and that any window size may be used. It is desirable to provide a window size such that the computational processing is minimal by the gateway.

In an alternate embodiment, the predetermined CV may be a two-dimensional array that is a function of a window of CVs corresponding to multiple initialization parameters, such that the predetermined CV may include:

$$\text{Predetermined } CV \text{ (window, parameter)} = \begin{bmatrix} v_{1,i-n} & \cdots & v_{m,i-n} \\ \vdots & \ddots & \vdots \\ v_{1,i+n} & \cdots & v_{m,i+n} \end{bmatrix} \quad (2)$$

where $v_{m,i+n}$ represents the computed CV at future value n for initialization parameter m, and i, m, and n are integers. The received CV are desirably compared with the two-dimensional number of predetermined CVs shown by equation 2.

In an exemplary embodiment, prior and future values of CVs may be determined for a window of five CVs (n=2) for 5 to 10 initialization parameters. It is understood that this window size and number of initialization parameters is not meant to be limiting, and that any window of CVs for any number of initialization parameters may be used. It is desirable to provide a window size and number of initialization parameters such that computational processing by the gateway is minimized. The window size may also be a function of the need for security. Networks needing more security may have a smaller window size to prevent unauthorized access.

In a further exemplary embodiment, each SPN device may be provided a window of initialization parameters upon initialization to the SPN. The SPN device desirably computes a CV using one of the initialization parameters for a predetermined number of packets. The SPN device may then switch to the next initialization parameter in the window and compute further CVs. The SPN device desirably transmits the CV as well the initialization parameter index and a count of the packet number within a portion of the IP packet. The initialization parameter index desirably corresponds to one of the initialization parameters in the window of initialization parameters.

The gateway receives the CV, the initialization parameter number, and packet number from the SPN device. The gateway may then process the initialization parameter corresponding to the initialization parameter number and further according to the number of packets to compute the predetermined CV. The gateway may then determine whether the received CV matches the predetermined CV. In this exemplary embodiment, resynchronization may be minimal because of the security provided by equipping each SPN device with a window of initialization parameters and further passing the initialization parameter index as well as packet number to the gateway.

Figure 6:
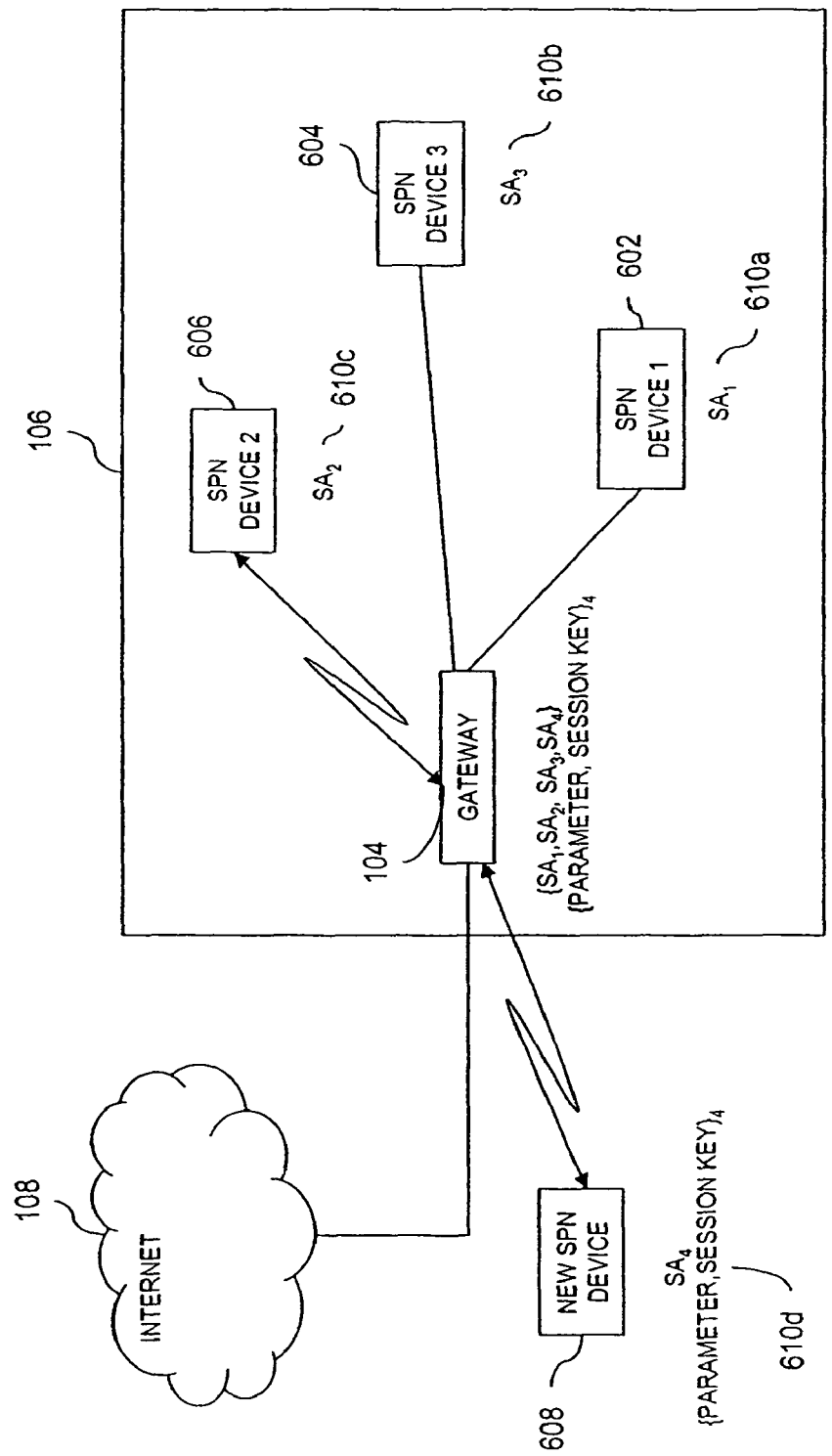
FIG. 6 is a system diagram illustrating an exemplary method for initializing and authorizing a device for the SPN, according to the present invention.

Referring now to FIG. 6, an illustrative example of initialization and authentication of a device 608 to be added to SPN 106, according to an exemplary embodiment of the present invention is described. In this example, SPN devices 602, 604, and 606 are established as part of SPN 106. Each of these SPN devices desirably communicates through gateway 104. For example, SPN device 606 and device 608 to be added are illustrated as being wirelessly-connected to gateway 104. SPN devices 602 and 604 are illustrated as being wire-connected to gateway 104. An SPN device may be any device capable of being connected to gateway 104 through wired and/or wireless connection, such as a cellular phone, a laptop, a personal desktop assistant (PDA), MP3 player, a digital camera, a video recorder, a video camera, and a workstation computer.

Each SPN device 602, 604, and 606 may use associated long-term Internet key exchange (IKE) v2 security associations (SAs) 610$a$-$c$ to set up secure packet identification parameters that are associated with SPN 106. It is contemplated that SAs 610$a$-$c$ may be formed using a manual authentication network access (MANA, see Security for Mobility, C. Mitchell (Ed.), Institution of Electrical Engineers, London, chapter 9.4, 2003) method the first time a device is added to SPN 106. Alternatively, an automatic authentication network access method may be used. It is desirable that the initialization provides for most of the parameters to be passed between the gateway and SPN device without significant user-interaction.

For new SPN device 608, either SPN device 608 or gateway 104 may initiate the protocol. Generally, new SPN device 608 may authenticate itself to gateway 104 using $SA_4$ 610$d$, for example, IPsec. IPsec is a known in the art method of providing secure exchange of packets at layer 3. Then a session key can be negotiated and a initialization parameter or a method for computing CVs may be provided to new SPN device 608. New SPN device 608 may then use the initialization parameter or method to generate a CV that is transmitted as part of an IP packet. The start of CV generation by new SPN device 608 is desirably agreed upon when new SPN device 608 connects to SPN 106.

Devices connected using MANA may be connected to the gateway via cable connection, Bluetooth in a secure environment or any other secure connection. Because the exemplary embodiment is implemented in layer 3, it is independent of the kind of application the device may be related to. There may be multiple ways to establish a network session depending on the device.

There may be multiple ways of transferring keys between a device and gateway 104 which may depend on the device (as described, for example, in the Mitchell reference). For example, implementing IPsec on a device has an associated computational cost. Devices having low computing power, such as a CD player, may not have sufficient resources to use IPsec. If the device is close enough to gateway 104, Bluetooth or a wireless connection, for example, may be used. A few secret keys may be passed between the device and gateway 104.

A single device may be able to handle multiple methods of transferring keys, such as IPsec, IKEv2, and cable (i.e., USB) connection. To handle initializing and authenticating multiple devices, a user may connect all of the devices using any combination of wireless or wired connections to gateway 104. Software may be used to generate the session key. A unique session key is typically negotiated between each device and gateway pair. All devices may then receive the respective unique session key, and using the session key secure encrypted values for the initialization parameter or method to generate CVs.

Gateway 104 may have different initialization parameter agreements with each SPN device 602, 604, 606, and 608. Alternatively, a single initialization parameter agreement may be used for all SPN devices. If the same initialization parameter agreement is used, extra identifiers may be desired to distinguish between SPN devices. If no further identifiers are used, a new device may use a CV already sent through the gateway and thus the gateway may not be able to differentiate an is SPN device and an unauthorized device using a CV sniffed from an SPN device's IP packet.

According to an embodiment of the present invention, an SPN device may be set up with a manual or automatic authentication as described above, after the network is contacted. Once the SPN identification parameters and initialization parameter are transferred to the SPN device, the SPN device may compute and transmit packets with a CV as described herein. According to the present invention, a user may not need to configure a firewall, perform encryption, configure IPsec, and/or configure a gateway.

Although the invention has been described as a system and a method, it is contemplated that it may be practiced by a computer configured to perform the method or by computer program instructions embodied in a computer-readable carrier such as an integrated circuit, a memory card, a magnetic or optical disk or an audio-frequency, radio-frequency or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method to limit access to a secure personal network (SPN) for a device having SPN identification parameters, the method comprising the steps of:
   performing an initialization protocol for the device to generate a confirmation value according to a function having a predetermined parameter;
   receiving an Internet protocol (IP) packet of the device, the packet including the confirmation value;
   comparing the confirmation value to each of a plurality of predetermined confirmation values, where number of the predetermined confirmation values depends upon expected packet loss;
   determining to allow access to the SPN when the confirmation value matches one of the plurality of predetermined confirmation values;
   determining to drop the IP packet when the confirmation value does not match the at least one predetermined confirmation value, wherein the confirmation value and the predetermined confirmation value are generated by an algorithm selected from the group consisting of a pseudorandom number generator, a hash function and a one-time password; and generating the predetermined parameter having a different value after a period of time, where duration of the period of time is determined by an operating environment of the device.

2. The method according to claim 1, wherein the confirmation value is compared to the at least one predetermined confirmation value for every IP packet.

3. The method according to claim 1, wherein the confirmation value is compared to the at least one predetermined confirmation value for one packet out of every N packets, where N is an integer.

4. The method according to claim 1, wherein the step of receiving the IP packet including the confirmation value further includes receiving an index associated with one of a plurality of predetermined parameters associated with generating the confirmation value and a packet number associated with the IP packet.

5. The method according to claim 4, wherein the at least one predetermined confirmation value is determined using the received index and the received packet number.

6. The method according to claim 1, wherein the confirmation value is encrypted and the method further comprising the step of decrypting the confirmation value.

7. The method according to claim 6, wherein the step of decrypting decrypts the confirmation values using a symmetric key algorithm.

8. The method according to claim 1, wherein the at least one predetermined confirmation value is provided by the steps comprising:

initializing a predetermined confirmation value function according to the algorithm by a predetermined parameter; and generating the at least one predetermined confirmation value from the initialized predetermined confirmation value function.

9. The method according to claim 8, wherein the predetermined parameter is a plurality of predetermined parameters, the step of initializing the predetermined confirmation value function initializes a plurality of predetermined confirmation value functions, and the step of generating the at least one predetermined confirmation value generates a plurality of predetermined confirmation values from the initialized plurality of predetermined confirmation value functions for each one of the plurality of predetermined parameters, respectively.

10. The method according to claim 9, wherein the confirmation value is compared to the plurality of predetermined confirmation values to allow access to the SPN when the confirmation value matches one of the plurality of predetermined confirmation values.

11. The method according to claim 1, the method further comprising the step of generating a further at least one predetermined confirmation value when a resynchronization event occurs.

12. The method according to claim 11, wherein the resynchronization event is provided for at least one of a predetermined period of time, a predetermined number of packets, a predetermined error count and a network resynchronization event.

13. The method according to claim 1, wherein the SPN is configured to receive IP packets containing the confirmation value from a plurality of devices, each device having the confirmation value, such that the plurality of devices communicate to each other.

14. The method according to claim 13, wherein the plurality of devices communicate to each other by one of direct communication and communication through a server apparatus.

15. A system for limiting access to a secure personal network (SPN), the system comprising:

a remote device configured to generate a confirmation value according to a function having a predetermined parameter and to include the confirmation value in each IP packet associated with the device, the remote device operable to generate the predetermined parameter having a different value after a period of time, where duration of the period of time is determined by an operating environment of the device; and a gateway which accepts an IP packet from the remote device when the IP packet includes the confirmation value and drops the IP packet from the remote device when the IP packet does not include the confirmation value, wherein the gateway compares the confirmation value to each of a plurality of predetermined confirmation values to determine whether the confirmation value matches one of the plurality of determined confirmation value, where number of predetermined confirmation values depends upon expected packet loss, and the confirmation value and the predetermined confirmation values are generated by an algorithm selected from the group consisting of a pseudorandom number generator, a hash function and a one-time password.

16. The system according to claim 15, wherein the confirmation value is about 6 bytes.

17. The system according to claim 15, wherein the remote device is selected from the group consisting of a cellular phone, a laptop computer, a workstation computer, a personal digital assistant (PDA), an MP3 player, an IPod, a digital camera, and a video camera.

18. The system according to claim 15, wherein the gateway is one of a further remote device and a server apparatus.

19. The system according to claim 15, wherein the remote device includes SPN identification parameters.

20. The system according to claim 15, wherein the remote device and the gateway generate a confirmation value and a predetermined confirmation value, respectively, from a predetermined confirmation value function according to the algorithm initialized by a predetermined parameter.

21. The system according to claim 20, wherein the predetermined parameter is between 32 to 128 bits.

22. A method to limit access to a secure personal network (SPN) for a remote device which transmits Internet protocol (IP) packets, the method comprising the steps of:

(a) performing an initialization protocol between the remote device and the SPN to configure the remote device to generate a confirmation value according to a function having a predetermined parameter and to assign SPN identification parameters to the remote device;

(b) generating the confirmation value in each transmitted IP packet associated with the remote device based on the initialization protocol;

(c) receiving one of the IP packets of the remote device;

(d) comparing the confirmation value in the received IP packet to each of a plurality of predetermined confirmation values, where number of predetermined confirmation values depends upon expected packet loss;

(e) determining to allow access to the SPN when the confirmation value matches one of the plurality of predetermined confirmation values or determining to drop the received IP packet when the confirmation value does not match one of the plurality of predetermined confirmation values;

(f) generating a resynchronization event after a period of time, where duration of the period of time is determined by an operating environment of the remote device; and (g) configuring the remote device to generate a further confirmation value according to a function having a different predetermined parameter when a resynchronization event is generated.

23. The method according to claim 22, wherein the resynchronization event is provided for at least one of a predetermined period of time, a predetermined number of packets, a predetermined error count and a network resynchronization event.

24. The method according to claim 22, wherein the at least one predetermined confirmation value comprises a plurality of predetermined confirmation values and the confirmation value is compared to the plurality of predetermined confirmation values to allow access to the SPN when the confirmation value matches one of the plurality of predetermined confirmation values.

25. The method according to claim 22, wherein the confirmation value is encrypted and the method further comprising the step of decrypting the confirmation value.

26. The method according to claim 22, wherein the step of performing the initialization protocol further comprises the steps of: authenticating the remote device to the SPN according to predetermined security associations of the remote device; negotiating a session key for the remote device when the device is determined to be authenticated; and transmitting the SPN identification parameters and confirmation value initialization parameters to the remote device using the negotiated session key, the confirmation initialization parameters used to configure the remote device to generate the confirmation values.

* * * * *